United States Patent
Kitaori et al.

(10) Patent No.: US 6,871,129 B2
(45) Date of Patent: Mar. 22, 2005

(54) CONTROL SYSTEM OF A CONTINUOUSLY VARIABLE TRANSMISSION FOR A VEHICLE AND METHOD

(75) Inventors: Ichiro Kitaori, Nagoya (JP); Hiroatsu Endo, Toyota (JP); Tatsuya Ozeki, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/134,515

(22) Filed: Apr. 30, 2002

(65) Prior Publication Data

US 2002/0173895 A1 Nov. 21, 2002

(30) Foreign Application Priority Data

May 17, 2001  (JP) .................................... 2001-148388

(51) Int. Cl.⁷ .............................. G06F 7/00; F16H 41/02
(52) U.S. Cl. ............................ 701/51; 475/125; 477/86
(58) Field of Search .............................. 701/53, 60–61, 701/51, 66, 54, 67, 22; 475/125–128, 192; 477/68, 86, 34, 37, 46, 39, 45, 40; 180/65.2, 65.3, 65.6, 65.1; 476/41, 46; 474/12, 28, 18, 70

(56) References Cited

U.S. PATENT DOCUMENTS

| | | | | |
|---|---|---|---|---|
| 5,334,097 A | * | 8/1994 | Tatara et al. ................... | 476/8 |
| 6,013,002 A | * | 1/2000 | Nonaka ........................... | 475/5 |
| 6,090,007 A | * | 7/2000 | Nakajima et al. ............. | 477/46 |
| 6,244,368 B1 | * | 6/2001 | Ando et al. ................ | 180/65.2 |
| 6,283,893 B1 | * | 9/2001 | Fritzner et al. ............. | 477/176 |
| 6,436,001 B1 | * | 8/2002 | Sakai et al. .................. | 475/216 |
| 6,514,166 B2 | * | 2/2003 | Yuasa et al. ................. | 475/125 |
| 6,524,217 B1 | * | 2/2003 | Murakami et al. ............. | 477/5 |
| 6,565,480 B2 | * | 5/2003 | Endo et al. .................... | 477/37 |
| 2001/0001372 A1 | * | 5/2001 | Park ......................... | 74/125.5 |
| 2002/0160873 A1 | * | 10/2002 | Weisz ............................ | 475/5 |
| 2002/0183144 A1 | * | 12/2002 | Crewe et al. .................. | 474/8 |

FOREIGN PATENT DOCUMENTS

| | | | |
|---|---|---|---|
| DE | 199 59 470 A1 | 6/2000 | |
| DE | 100 04 401 A1 | 8/2000 | |
| EP | 0 759 518 A2 | 2/1997 | |
| EP | 0 890 763 A2 | 1/1999 | |
| JP | 5-87219 | 4/1993 | |
| JP | B2 5-50615 | 7/1993 | |
| JP | 6-109115 | 4/1994 | |
| JP | 8-210451 | 8/1996 | |
| JP | A 8-296731 | 11/1996 | |
| JP | 09303541 A * | 11/1997 | .......... F16H/61/06 |
| JP | 10-9373 | 1/1998 | |
| JP | 11091413 A * | 4/1999 | .......... B60K/41/26 |
| JP | 2000-310317 | 11/2000 | |

* cited by examiner

Primary Examiner—Jacques H. Louis-Jacques
(74) Attorney, Agent, or Firm—Oliff & Berridge, PLC (57) ABSTRACT

A control system of a continuously variable transmission for a vehicle compensates for delays in an estimated input torque $T_{INE}$ based on a gradient value (variation) of the estimated input torque $T_{INE_t}$. For example, a friction force being applied to a driving belt of a continuously variable transmission is regulated according to the compensated estimated input torque $T_{INE}$. Accordingly, an appropriate torque transmitting capacity is maintained in the transmission even at a rapid accelerating operation of the vehicle, while realizing good fuel efficiency.

14 Claims, 8 Drawing Sheets

| S-POSITION | D-MODE | ENGAGING ELEMENT | C1 | C2 | B1 |
|---|---|---|---|---|---|
| B,D | | ETC MODE | × | ○ | × |
| | | DIRECT DRIVE MODE | ○ | ○ | × |
| | | MOTOR DRIVE MODE (FORWARD) | ○ | × | × |
| N,P | | NEUTRAL | × | × | × |
| | | CHARGINE/ENGINE START-UP MODE | × | × | ○ |
| R | | MOTOR DRIVE MODE (REVERSE) | ○ | × | × |
| | | FRICTION DRIVE MODE | ○ | × | △ |

FIG. 5A (a) ETC MODE

FIG. 5B (b) DIRECT DRIVE MODE

FIG. 5C (C) MOTOR DRIVE MODE (FORWARD)

CONTROL SYSTEM OF A CONTINUOUSLY VARIABLE TRANSMISSION FOR A VEHICLE AND METHOD

INCORPORATION BY REFERENCE

The disclosure of Japanese Patent Application No. 2001-148388 filed on May 17, 2001 including the specification, drawings and abstract is incorporated herein by reference in its entirety.

BACKGROUND OF THE INVENTION

1. Field of Invention

The invention relates to a control system of a continuously variable transmission (hereinafter referred to as a "CVT") for a vehicle, and more particularly, to a control system for regulating a torque transmitting capacity of the CVT on the basis of an estimated input torque.

2. Description of Related Art

As is widely known, a CVT for a vehicle is employed to continuously change the speed ratio and generally constructed so as to transmit power via a friction force generated by power transmitting members. It is, therefore, possible to improve the fuel efficiency and durability of the vehicle by controlling the friction force generated by the power transmitting members to a required value in accordance with an input torque to the CVT. When an internal combustion engine is employed as a driving motor, an estimated value of the input torque to the CVT can be calculated based on a throttle opening and engine speed both reflecting a torque required by a vehicle operator in accordance with a previously stored relationship. When an electric motor is employed as the driving motor, the estimated value of the input torque is calculated based on an electric current supplied for driving the motor (hereinafter referred to as "driving current") in accordance with a previously stored relationship. In a belt type CVT serving to transmit power via a driving belt wrapped around a pair of pulleys having a variable effective diameter, the pressure applied to the driving belt by a hydraulic actuator, in accordance with the estimated input torque, is adjusted so as to control the transmitting torque capacity to an appropriate value. Also, in a traction drive CVT, which is a type of CVT including a pair of cones and a roller that is held therebetween and is rotatably supported around a rotation axis that lies in a plane perpendicular to those rotation axes, the holding pressure for holding the roller is controlled by a hydraulic actuator. As a result, the torque transmitting capacity of the CVT for the estimated input torque can be controlled to an appropriate value.

When the power of the vehicle is rapidly changed, such as when the output of the driving motor is rapidly increased upon kick-down operation of the vehicle operator who depresses an accelerator pedal deeply and rapidly, the hydraulic control performed by the CVT may fail to follow the rapid change. As a result, the CVT may fail to achieve a required hydraulic pressure or a required torque transmitting capacity, resulting in slippage between the power transmitting members. Such delay in the hydraulic control is caused by delays in mechanical operation for regulating hydraulic pressures. The delays in mechanical operation are attributable to the viscosity characteristics of operating oil in a hydraulic pressure control circuit or the structure of pressure control valves, and delays in data transfer among a plurality of electronic control units (hereinafter referred to as "ECUs") respectively employed for engine control, hybrid system control, CVT control, and the like.

There has been proposed a control system disclosed in Japanese Laid-Opened Patent Publication No. 8-285021, in which even when the CVT is rapidly shifted upon rapid acceleration of the vehicle, the torque transmitting capacity of a belt type CVT is controlled to an appropriate capacity by applying an output line pressure corrected with a transient line pressure that is determined by an estimated engine torque and a shifting speed. In the aforementioned control system, however, the output line pressure is uniformly increased independent of a change rate of the estimated engine torque and therefore needs to be maintained at a level high enough to provide a sufficient magnitude of margin in order to prevent slippage of the belt. Accordingly, it occurs that the holding pressure becomes excessive in a normal operation state, resulting in an adverse effect to the fuel efficiency of the vehicle.

SUMMARY OF THE INVENTION

It is an object of the invention to provide a control system for a continuously variable transmission (CVT) employed for a vehicle, which provides an appropriate torque transmitting capacity even upon rapid acceleration of the vehicle, while realizing good fuel efficiency.

A control system of a continuously variable transmission for a vehicle, which changes a speed ratio of an input rotating member and an output rotating member by continuously changing a radial position at which torque is transmitted between a power transmitting member interposed between the input rotating member and the output rotating member, and each of the input and the output rotating members, the radial position being measured from a center of rotation of each of the input and the output rotating members, comprising a controller that controls a capacity of torque transmission between the each of the input and output rotating members and the transmitting member into a value corresponding to an input torque of the continuously variable transmission;

(1) calculates an estimated input torque of the continuously variable transmission;

(2) calculates an amount of change in the calculated estimated input torque of the continuously variable transmission;

(3) compensates for a delay in the estimated input torque on the basis of the calculated variation of the estimated input torque of the continuously variable transmission.

In the above-described control system, the delay in the estimated input torque, calculated based on variations of the estimated input torque, is compensated such that the torque transmitting capacity of the power transmitting member of the CVT is controlled to a value corresponding to the estimated input torque having the delay compensated. Accordingly, it is not necessary to continuously apply excessive torque transmitting capacity even at the rapid accelerating operation, resulting in an appropriate torque capacity and good fuel efficiency.

In a preferred embodiment, the controller calculates the variation of the estimated input torque which is equal to or greater than a predetermined value. If the variation is less than the predetermined value, the variation of the estimated input torque is not calculated. As a result, the delays in the estimated torque is not compensated for. If the variation is equal to or greater than the predetermined value, the variation of the estimated input torque is calculated and the delays in the estimated torque is compensated for.

In the preferred embodiment, the controller compensates for the delay in the calculated estimated input torque by adding a product of a compensation gain obtained in accordance with a start-up characteristic of a torque of a driving motor of the vehicle, and the calculated variation in the calculated estimated input torque, to the calculated estimated input torque. In the above-described structure, delays in the estimated input torque can be precisely compensated for, regardless of the type of power plants to be switched according to the drive mode. Accordingly an appropriate torque transmitting capacity is obtained even at the rapid acceleration operation of the vehicle, thus realizing good fuel efficiency.

In the preferred embodiment, the vehicle comprises a hybrid vehicle, and wherein the controller determines a currently selected drive mode of the vehicle; and determines the compensation gain in accordance with the determined currently selected drive mode of the vehicle. In the above-described structure, a compensation gain suitable for the type of the driving motor to be used in accordance with the drive mode of the vehicle can be used. Accordingly, delays in the estimated input torque may be compensated for precisely.

In the preferred embodiment, the continuously variable transmission comprises a belt type continuously variable transmission that transmits power via a frictional force generated between a pair of pulleys each having a variable effective diameter and a driving belt wrapped around the pair of variable pulleys, wherein the controller controls the capacity of the torque transmission of the belt type continuously variable transmission by determining a holding pressure of the driving belt on the basis of the estimated input torque with the delay compensated. In the above-described structure, an appropriate torque transmitting capacity of the belt drive CVT is obtained even at the rapid acceleration operation of the vehicle, realizing good fuel efficiency.

DETAILED DESCRIPTION OF PREFERRED EMBODIMENTS

Figure 1:
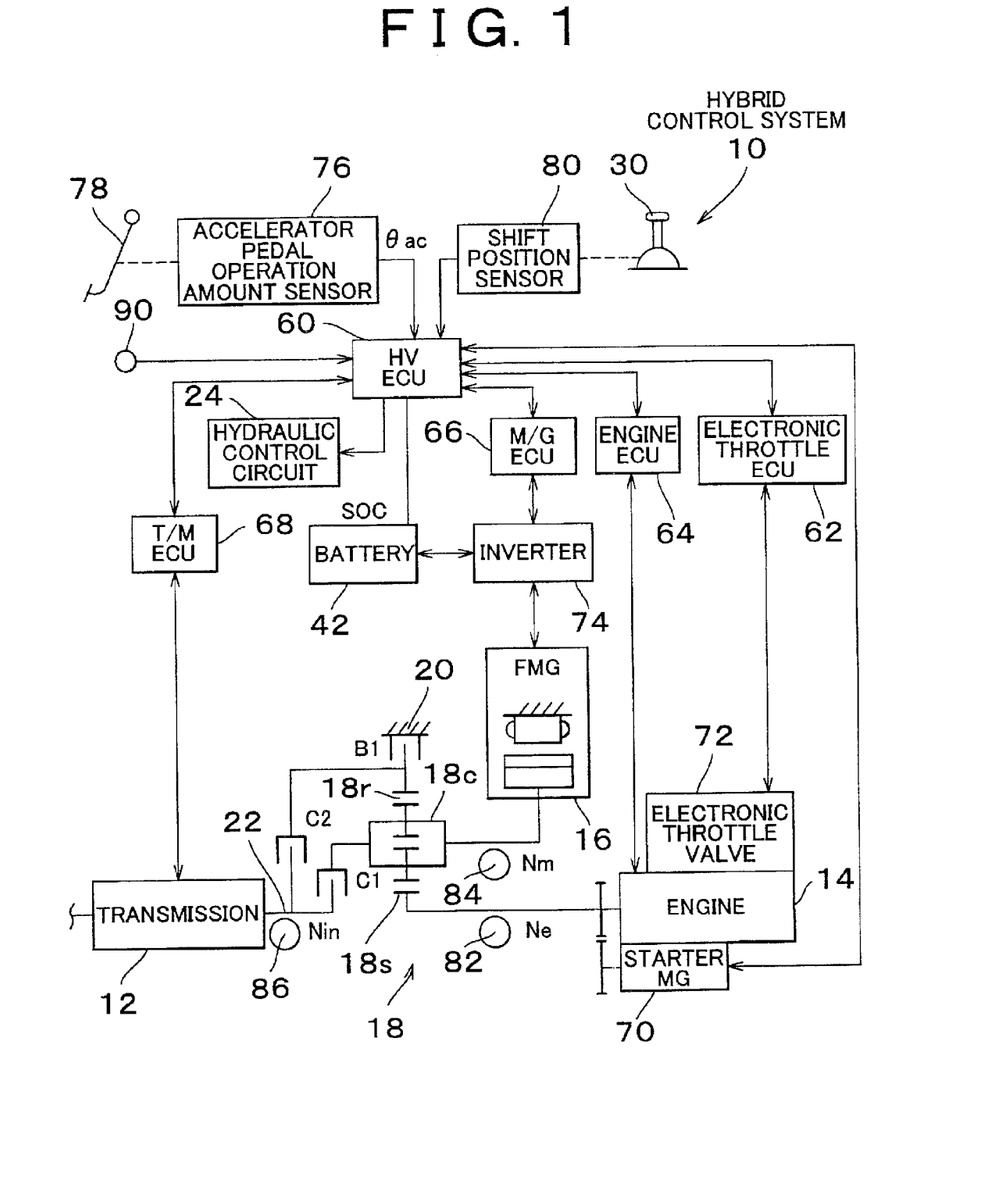
FIG. 1 is a schematic view showing a control system applied to a hybrid vehicle according to an embodiment of the invention.
Figure 2:
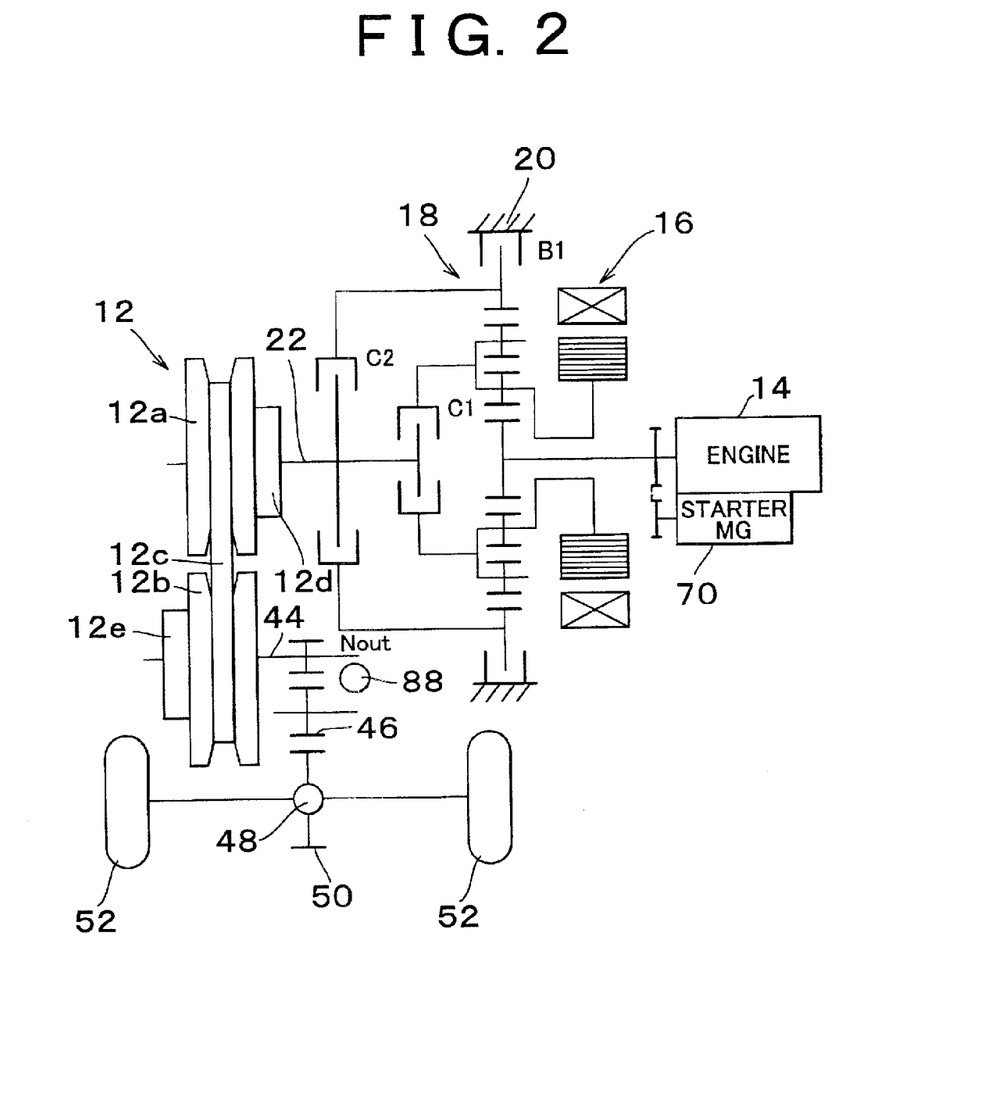
FIG. 2 is a view showing a construction of a power train of the hybrid vehicle as shown in FIG. 1.

A first embodiment of the invention will be described with reference to the drawings. FIG. 1 is a schematic view showing a construction of a hybrid control system 10 applied to a hybrid vehicle according to an embodiment of the invention. FIG. 2 is a view showing a construction of a power train of the hybrid vehicle, that is, a power transmitting system including a transmission 12.

The power train of the hybrid vehicle shown in FIGS. 1 and 2 includes an internal combustion engine (hereinafter referred to as an "engine") 14 which, by combusting the fuel, generates power or output torque corresponding to quantity of the supplied fuel, a front motor generator (hereinafter referred to as an "FMG") 16 that operates as an electric motor and an electric power generator, and a double-pinion type planetary gear device 18. Generally, the power train is transversely mounted in an FF vehicle. The planetary gear device 18 includes a sun gear 18s connected to the engine 14, a carrier 18c connected to the FMG 16, and a ring gear 18r connected to a case 20 via a first brake B1. Further, the carrier 18c is connected to an input shaft 22 of the transmission 12 via a first clutch C1, and the ring gear 18r is connected to the input shaft 22 via a second clutch C2. The engine 14 and FMG 16 serve as the driving motor of the hybrid vehicle, and the planetary gear device 18 serves as a differential gear device for combining and distributing the power.

Figure 3:
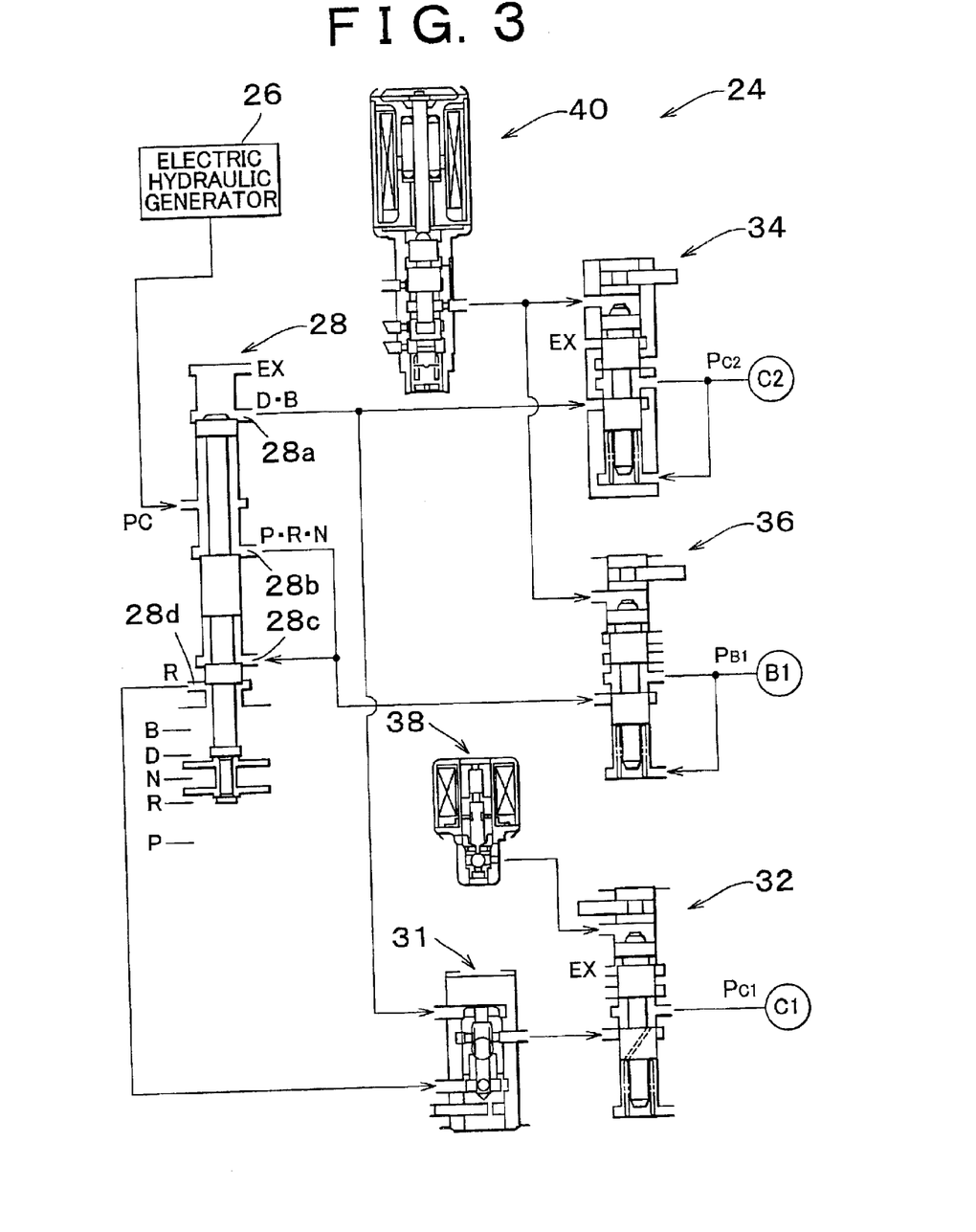
FIG. 3 is a circuit diagram showing a part of a hydraulic control circuit of the hybrid vehicle shown in FIG. 1.

The first and second clutches C1, C2 and the first brake B1 are a band type or wet multiple disc type hydraulic friction device and are frictionally engaged by operating oil supplied from a hydraulic control circuit 24 shown in FIG. 3. FIG. 3 shows main components of the hydraulic control circuit 24. As shown in FIG. 3, an original pressure PC generated by an electric hydraulic generator 26 having an electric pump (not shown in FIG. 3) is supplied to the first clutch C1, second clutch C2, first brake B1 via a manual valve 28, according to a shift position of a shift lever 30 (refer to FIG. 1). The shift lever 30 is formed of a shift operating member that is operated by the vehicle operator for changing the shift position. In this embodiment, the shift position is selected from 5 positions, that is, B, D, N, R, and P. The manual valve 28 is connected to the shift lever 30 via cables, links or the like and the valve position thereof is mechanically switched by operating the shift lever 30.

The position "B" represents a shift position for forward traveling at which a relatively large braking force is generated in the power train by, for example, down-shifting the transmission 12 during forward traveling of the vehicle. The position "D" represents a shift position for forward traveling at which the original pressure PC is supplied from an output port 28a of the manual value 28 to the first and second clutches C1, C2. The original pressure PC is supplied to the first clutch C1 via a shuttle valve 31. The position "N" represents a shift position at which the transmission of the power from the power source is cut off. The position "R" represents a shift position for reverse traveling, and the position "P" represents a shift position at which the transmission of the power from the power source is cut off and also the rotation of driven wheels is mechanically locked by means of a parking lock device (not shown in FIG. 3). At the aforementioned positions "N", "R", "P", the original pressure PC is supplied from an output port 28b of the manual valve 28 to the first brake B1. The original pressure PC output from the output port 28b is input to a return port 28c. At the position "R", the original pressure PC, which is returned into the return valve 28c, is transmitted through an output port 28d and the shuttle valve 31 to be supplied to the first clutch C1.

The first and second clutches C1, C2, and the first brake B1 are respectively provided with control valves 32, 34, and 36 for controlling hydraulic pressures $P_{C1}$, $P_{C2}$, and $P_{B1}$ respectively. The hydraulic pressure $P_{C1}$ to be input to the first clutch C1 is regulated by means of an on-off valve 38, and hydraulic pressures (engagement pressures) $P_{C2}$ and $P_{B1}$ to be input to the second clutch C2 and the first brake B1 are regulated by means of a linear solenoid valve 40.

Figure 4:
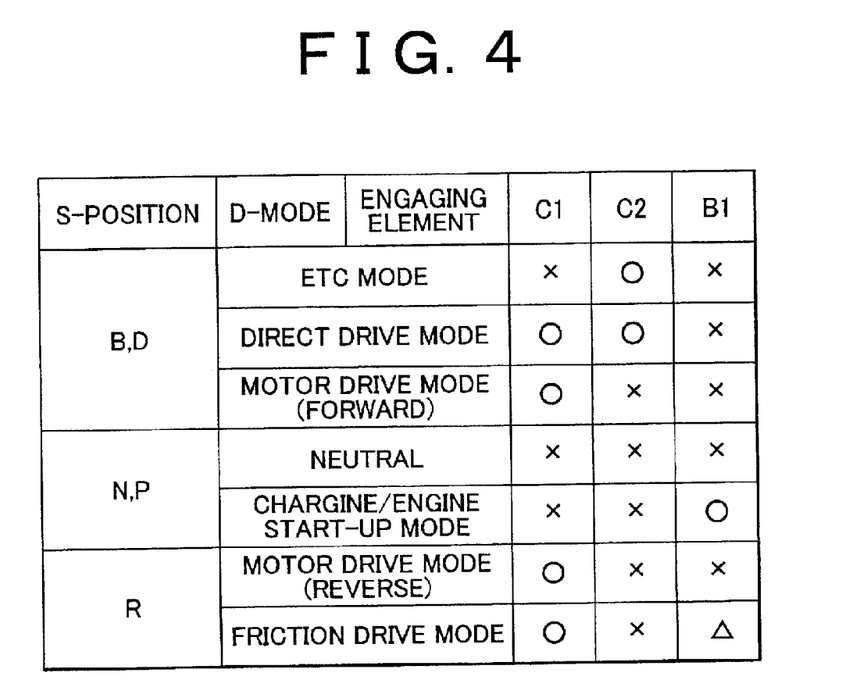
FIG. 4 is a table illustrating the relationships between each of several drive modes established at a hybrid drive control system shown in FIG. 1 and operation states of clutches and a brake of the vehicle.

The drive modes shown in FIG. 4 are determined according to operation states of the first clutch C1, second clutch C2, and first brake B1. At the shift position "B" or "D", the drive mode is set to "ETC (Electronic Torque Converter) mode", "direct drive mode", or "motor drive mode (forward travelling)". For example, in the ETC mode, the second clutch C2 is engaged while the first clutch C1 and the first brake B1 are released. In this state, the sun gear 18s, carrier 18c and ring gear 18r are relatively rotatable and the engine 14 and the FMG 16 are both operated to apply torque to the sun gear 18s and the carrier 18c for rotating the ring gear 18r, thus driving the vehicle forward.

In the direct drive mode, the first and second clutches C1 and C2 are engaged while the first brake B1 is released. In this mode, the engine 14 is operated to drive the vehicle forward, and the FMG 16 is also operated (power-running controlled) to drive the vehicle according to the state of charge (SOC), or remaining capacity, of a battery 42 (refer to FIG. 1). The torque to be generated from the engine 14 (engine torque) is reduced by an amount corresponding to the torque added by the FMG 16. Further, in this mode, the FMG 16 is also operated as an electric power generator for generating electric power. At this time, the engine torque is increased by an amount corresponding to the torque consumed in the power generation, in order to maintain the SOC within a certain range where a good charge-discharge efficiency can be secured.

In the motor drive mode (forward traveling), the first clutch C1 is engaged while the second clutch C2 and the first brake B1 are released. In this mode, since the engine 14 is disengaged from the power train, the FMG 16 only drives the vehicle forward. As described above, the second clutch C2 is released to disengage the engine 14 from the power train as the drive mode is switched from the direct drive mode to the motor drive mode. The second clutch C2, thus, serves as a power transmission engaging/disengaging device between the engine 14 and driven wheels 52 or the transmission 12 so as to transmit or cut off the power therebetween.

Figure 5A:
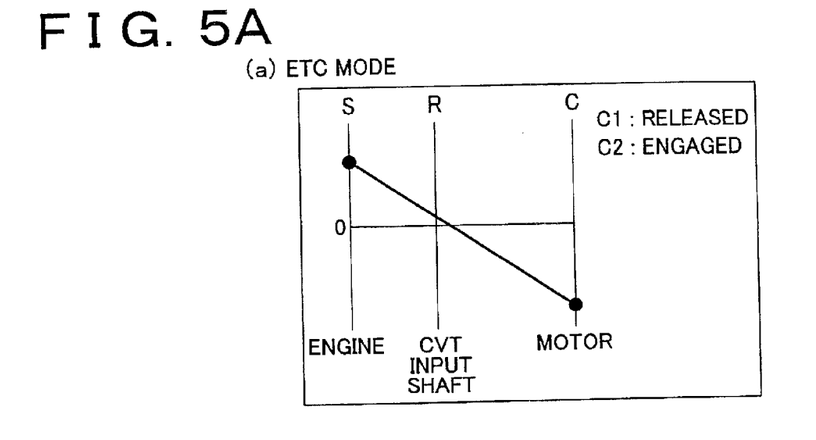
FIGS. 5A–5C show charts representing relationships of rotation speeds of the rotating members at a planetary gear device with respect to an ETC (Electronic Torque Converter) mode, direct drive mode, and motor drive mode (forward travelling), respectively.
Figure 5B:
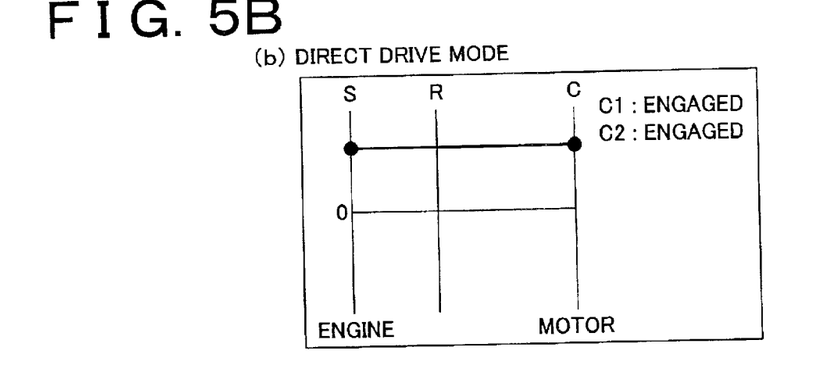
Figure 5C:
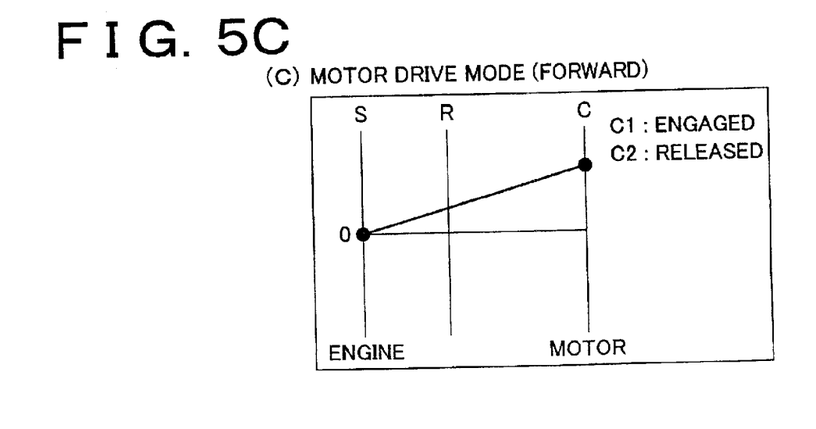

FIGS. 5A to 5C show charts indicating respective operation states of the planetary gear device 18 in the above-described forward traveling modes. In the charts, vertical axes S, R, and C represent the rotation speeds of the sun gear 18s, the ring gear 18r and the carrier 18c, respectively. An interval between the respective axes is defined by a speed ratio $\rho$ (the number of gear teeth of the sun gear 18s/the number of gear teeth of the ring gear 18r). More specifically, supposing that an interval between S and C is 1, an interval between R and C is determined as $\rho$ (about 0.6 in this embodiment). Referring to FIG. 5A, the torque ratio in the ETC mode of the engine torque Te, CVT input shaft torque Tin, and motor torque Tm results in $\rho:1:1-\rho$. The motor torque Tm is smaller than the engine torque Te, and the CVT input shaft torque, in a steady state, is determined as the sum of the motor torque Tm and the engine torque Te. As described above, in the embodiment, "CVT" as the transmission 12 is a belt drive continuously variable transmission.

Referring to FIG. 4, at the shift positions "N" or "P", the drive mode is set to the "neutral mode" or "charge/engine-start mode". In the neutral mode, the first and second clutches C1, C2 and the first brake B1 are all released. In the charge/engine start mode, the first brake B1 is engaged while the first and second clutches C1 and C2 are released. In the charge/engine start mode, the FMG 16 is controlled to rotate in reverse to start the engine 14, or is driven by the engine 14 via the planetary gear device 18 so as to generate electric power for charging the battery 42.

At the shift position "R", the drive mode is set to "motor drive mode (reverse travelling)" or "friction drive mode". In the motor drive mode (reverse travelling), the first clutch C1 is engaged while the second clutch C2 and the first brake B1 are released. In this mode, the FMG 16 is controlled to rotate in reverse to rotate the carrier 18c and further the input shaft 22 in reverse, thus driving the vehicle to travel in reverse. The friction drive mode is performed when a torque assistance is required during the reverse travelling of the vehicle in the motor drive mode. In this mode, the engine 14 is first started and rotates the sun gear 18s in normal direction thereby to rotate the ring gear 18r in normal direction, while the first brake B1 is slip-engaged to restrict the rotation of the ring gear 18r. In this state, the carrier 18c rotates in reverse to assist the reverse travelling of the vehicle.

As described above, the transmission 12 is a belt drive CVT, in which the power output from an output shaft 44 (refer to FIG. 2) of the transmission 12 is first transmitted through a counter gear 46 to a ring gear 50 of the differential gear device 48. The transmitted power is then distributed to right and left driven wheels 52 (front wheels in this embodiment) by the differential gear device 48. The transmission 12 includes a pair of variable pulleys 12a, 12b having variable effective diameter and a driving belt 12c, for transmitting the power, which is wrapped around the variable pulleys 12a, 12b. As a width of a V-shaped groove of the input-side variable pulley 12a is changed by controlling an input hydraulic cylinder 12d, a speed ratio $\gamma$ (input shaft rotation speed Nin/output shaft rotation speed Nout) continuously changes. As a holding pressure applied from the secondary variable pulley 12b to the driving belt 12c, which is a frictional force generated therebetween, is changed by controlling an output hydraulic cylinder 12e, a transmissible tensile force via the driving belt 12c, or torque transmitting capacity, is adjusted. The hydraulic control circuit 24 includes a control circuit having pressure regulating valves. The pressure regulating valves, which being supplied with the operating oil from a common electric operating oil pressure generator, regulate a belt transmissible tensile force control pressure generated in the output hydraulic cylinder 12e, which is a control pressure for controlling the speed ratio $\gamma$ and the belt transmissible tensile force of the transmission 12. The operating oil in the hydraulic control circuit 24 is stored in an oil pan and is used for lubricating the planetary gear device 18, differential gear device 48 and the like. Further, the operating oil is partially supplied to the FMG 16 for cooling the FMG 16 and is circulated therein and along a housing thereof such that the oil flows in contact with the housing e.g. through a coolant passage formed on the housing.

A hybrid system electronic control unit (hereinafter referred to as "HV ECU") 60 in the hybrid control system 10 (refer to FIG. 1) according to the embodiment, includes a CPU, RAM, ROM, and the like, and performs signal processing according to programs previously stored in the ROM while utilizing the temporary data storage function of the RAM. The HV ECU 60 controls an electronic throttle ECU 62, an engine ECU 64, a M/G (motor/generator) ECU 66, a TM (transmission) ECU 68, the on-off valve 38 of the hydraulic control circuit 24, the linear solenoid valve 40, and a starter motor generator (hereinafter referred to as "SMG") 70 which operates as a starter of the engine 14. The electronic throttle ECU 62 controls throttle openings of the electronic throttle valve 72 by means of an actuator or the like (not shown). The engine ECU 64 controls the engine output of the engine 14 by controlling a fuel injection amount, variable valve timing mechanism, and ignition timing. The M/G ECU 66 controls driving torque, regenerating brake torque, and the like, of the FMG 16 via an inverter 74. The TM ECU 68 controls the speed ratio γ and belt transmissible tensile force of the transmission 12. The SMG 70 operates as a motor and electric power generator and is operatively linked to a crank shaft of the engine 14 via a power transmitting member such as a belt and a chain.

The HV ECU 60 receives signals from an accelerator pedal operation amount sensor 76. Such signals indicate accelerator pedal operation amount θac, which is an amount that an accelerator pedal 78, as an acceleration control member, is operated. The HV ECU 60 also receives signals from a shift position sensor 80. Those signals indicate the shift position (P, R, N, D, B, SD (sport drive mode) etc.) to be selected by operating the shift lever 30. The HV ECU 60 further receives signals indicating an engine rotation speed (rotation number) Ne from an engine rotation speed sensor 82, signals indicating a motor rotation speed (rotation number) Nm from a motor rotation speed sensor 84, signals indicating an input shaft rotation speed (rotation speed of the input shaft 22) Nin from an input shaft rotation speed sensor 86, signals indicating an output shaft rotation speed (rotation speed of the output shaft 44) Nout, which corresponds to a vehicle speed V, from an output shaft rotation speed sensor 88, and signals indicating an oil temperature $TH_{CVT}$, which is a temperature of the operating oil of the hydraulic control circuit 24, from a CVT oil temperature sensor 90. Additionally, various signals indicating operation states such as the SOC, which is a remaining battery capacity of the battery 42, are input to the HV ECU 60. The SOC may be simply determined from the battery voltage or may be calculated by continuously integrating charge/discharge amounts. The accelerator pedal operation amount θac is equivalent to driver's required output. The opening of the electronic throttle valve 72 is controlled based on the accelerator pedal operation amount θac.

Figure 6:
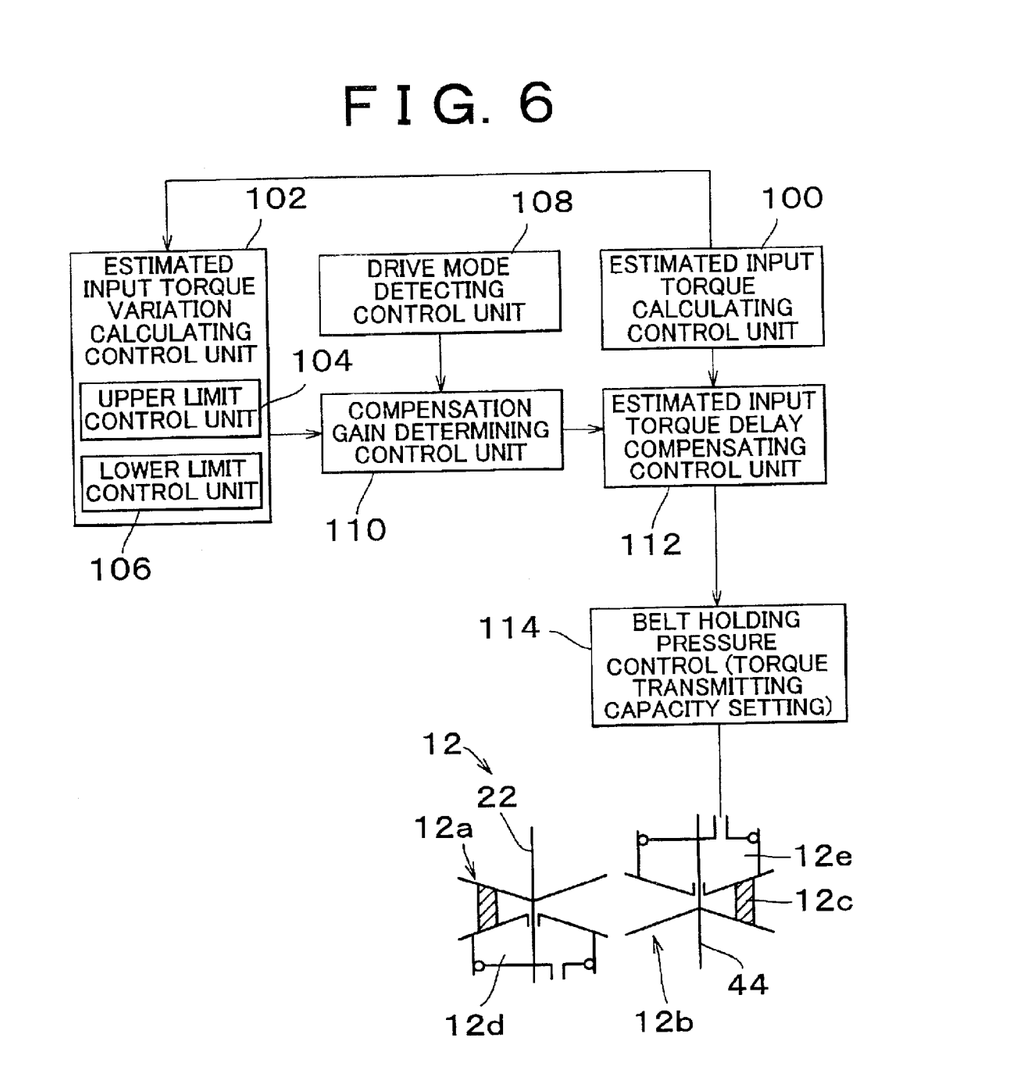
FIG. 6 is a block diagram showing an estimated input torque compensating control, which is a main control of a HV ECU shown in FIG. 1, for a belt transmissible tensile force control or belt holding pressure control of a transmission.

FIG. 6 is a functional block diagram showing an estimated input torque compensating control for controlling the belt transmissible tensile force (holding pressure) at the transmission 12, which is a main control to be performed by the HV ECU 60 as the hybrid system electronic control unit. An estimated input torque calculating control unit 100 shown in FIG. 6 calculates (estimates) an estimated input torque $T_{INE}$ (=engine torque Te) to be input to the transmission 12 from the presently operative driving motor. For example, when the direct drive mode is selected, by which the engine 14 is engaged with the transmission 12, the estimated input torque $T_{INE}$ from the engine 14 is calculated based on throttle openings (opening of the electronic throttle valve 72) and engine rotation speeds according to previously stored relationships. Meanwhile, when the motor drive mode is selected, by which the FMG 16 is engaged with the transmission 12, the estimated input torque $T_{INE}$ from the FMG 16 (=motor torque Tm) is calculated based on the actual driving electric current according to a previously stored relationship. Further, when the ETC mode is selected, by which the engine 14 and the FMG 16 are both engaged with the transmission 12 via the planetary gear device 18 which operates as the differential gear device for combining and distributing the power, the estimated input torque $T_{INE}$ (=CVT input shaft torque Tin) is calculated based on the engine torque Te and the motor torque Tm according to the distribution ratio, that is, engine torque Te: CVT input shaft torque Tin: motor torque Tm=ρ:1:1−ρ.

Figure 7:
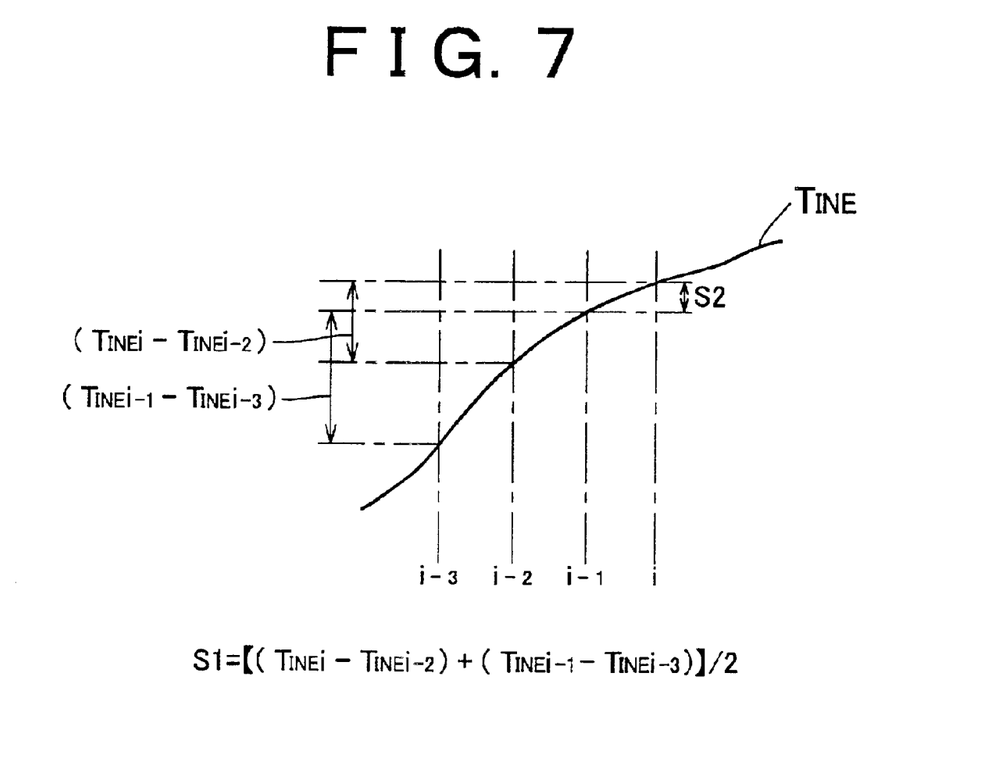
FIG. 7 illustrates calculated gradient values S1 and S2.

An estimated input torque variation calculating unit 102 calculates a change rate (variation per unit of time) of the estimated input torque $T_{INE}$ such as gradient values S1 and S2 In FIG. 7, "i" represents the present time point, "i−1" represents an one-cycle earlier time point, "i−2" represents a two-cycle earlier time point, and "i−3" represents a three cycle earlier time point. Here, the gradient value S1 is determined as [($T_{INEi}$-determined as ($T_{INEi}-T_{INEi-1}$). The gradient value S1 is an average value of ($T_{INEi}-T_{INEi-2}$) and ($T_{INEi-1}-T_{INEi-3}$) in two adjacent time ranges as shown in FIG. 7.

The estimated input torque variation calculating unit 102 includes an upper limit control unit 104 and a lower limit control unit 106. If the gradient value S1 (variation) is greater than a predetermined upper limit value B, the upper limit control unit 104 limits (replaces) the gradient value S1 (variation) to the upper limit value B. If the gradient value (variation) S1 is less than a predetermined lower limit value (e.g. 0), the lower limit control unit limits (replaces) the gradient value (variation) S1 to the lower limit, e.g. 0, thereby maintaining the variation in the estimated input torque within the range between the above-indicated predetermined upper and lower limit values.

A drive mode detecting control unit 108 determines the currently selected drive mode of the hybrid vehicle (ETC mode, direct drive mode, or motor drive mode) on the basis of the vehicle speed, accelerator pedal operation amount (throttle opening) and the like. A compensation gain determining control unit 110 determines compensation gains based on a previously stored relationship based on the currently selected drive mode, being detected by the drive mode detecting control unit 108. The compensation gain G, for example, is provided such that compensation gains $G_1$, $G_2$, and $G_3$ are set according to the detected drive mode; the motor drive mode, the direct drive mode where the engine only drives the vehicle, and ETC mode respectively. The compensation gain G is predetermined so as to compensate for delays in the estimated input torque $T_{INE}$ from actual input torque for preventing delays in the belt pinching pressure control and is determined on the basis of, start-up operation characteristics of the FMG 16 if it is to be applied to the motor drive mode, start-up operation characteristics of the engine 14, if it is to be applied to the direct drive mode and, the start-up operation characteristics of both if it is to be applied to the ETC mode.

An estimated input torque delay compensating control unit 112 compensates the delays in the estimated input torque $T_{INE}$ calculated by the estimated input torque calculating control unit 100 based on the gradient value S1 indicating the variations of the estimated input torque, calculated by the estimated input torque variation calculating unit 102. Specifically, the compensation is made according to an expression (1) shown below, using the gradient value S1 determined by the estimated input torque variation calculating control unit 102 and the compensation gain G determined by the compensation gain determining control unit 110. In the expression (1), "$T_{INE}$" in the left side is the estimated input torque after being compensated, and in the right side, "$T_{INE}$" in the first term is the same before being compensated and "G·S1" in the second term are the compensating factor.

$$T_{INE} = T_{INE} + G \cdot S1 \quad (1)$$

A belt holding pressure control unit 114 generates control pressures for controlling the transmissible tensile force based on the actual speed ratio γ and vehicle speed V according to a generally known relative expression such that the generated control pressure becomes a minimum appropriate pressure within the range where the slippage of the driving belt 12c does not occur when transmitting the compensated estimated input torque $T_{INE}$. The generated control pressure is supplied to the output hydraulic cylinder 12e of the secondary variable pulley 12b. This transmissible tensile force control pressure is used to control the holding pressure applied from the secondary variable pulley 12b to the driving belt 12c, that is, the friction force therebetween, and thereby to substantially determine the torque transmitting capacity of the transmission 12. In this way, the holding pressure control serves to set a torque transmitting capacity.

Figure 8:
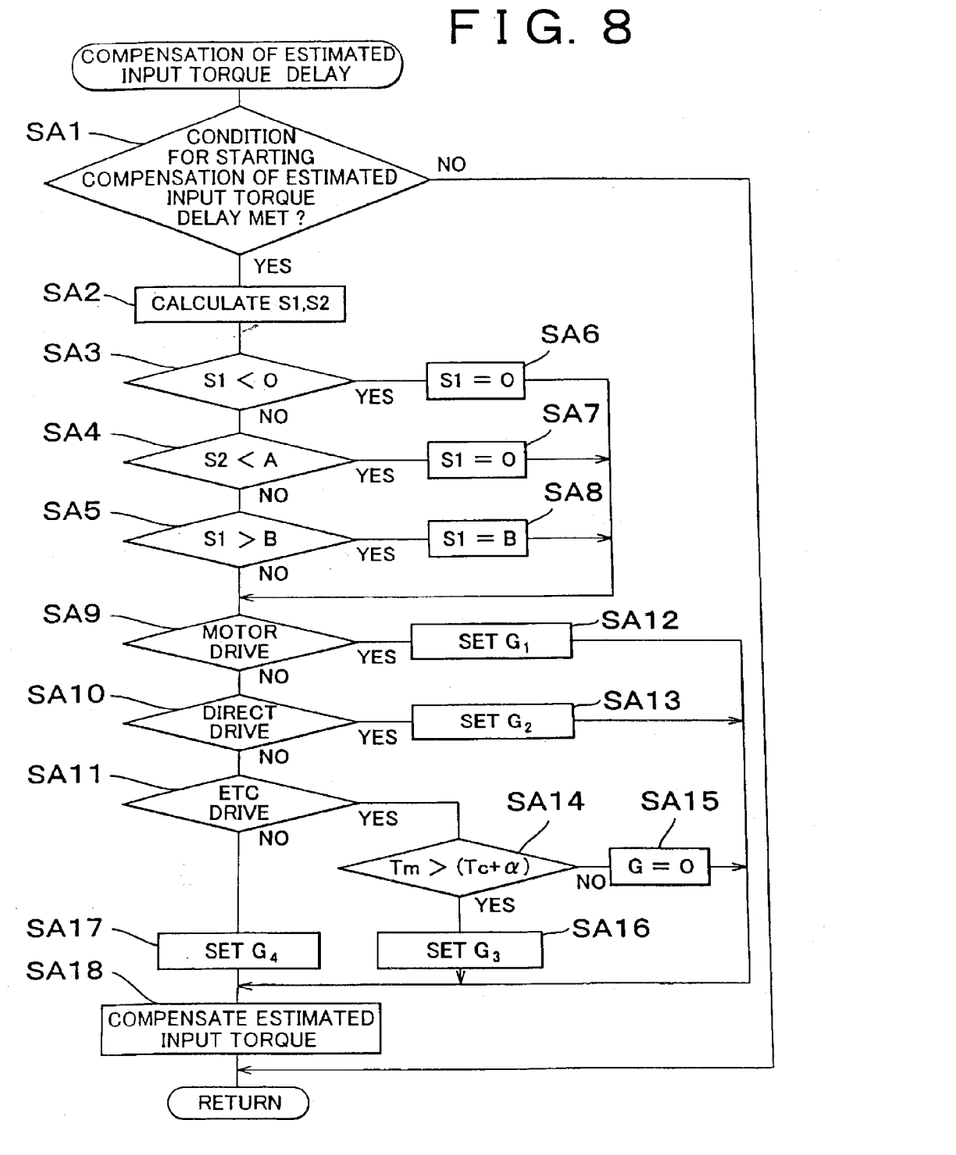
FIG. 8 is a flowchart showing an estimated input torque compensating control of a main part of the HV ECU for the belt transmissible tensile force control or belt holding pressure control of the transmission.

FIG. 8 is a flowchart showing the routine of an estimated input torque compensation control for the belt transmissible tensile force control (belt holding pressure control), which is a main control executed by the HV ECU 60 as the hybrid system electronic control unit. This control routine is repeatedly executed in intervals of about a few to dozens of milliseconds. Steps corresponding to the belt holding pressure control, general procedures of which are widely known, are not shown in FIG. 8.

In the routine shown in FIG. 8, it is first determined in step SA1 whether conditions for starting the compensation of estimated input torque are satisfied, where, for example, it is determined whether a time that has elapsed since the variation of the throttle opening per unit of time became greater than predetermined is within a certain range. If the time is out of the range, the routine is brought to an end. Conversely, if the time is within the range, the HV ECU 60 proceeds to step SA2, which is a step corresponding to the input torque variation calculating control 102. In step SA2, the variation of the estimated input torque $T_{INE}$ per unit of time (change rate of the estimated input torque $T_{INE}$) is calculated, being continuously determined in steps corresponding to the estimated input torque calculating control unit 100, for example, the gradient values S1 and S2 are calculated.

Steps SA3 through SA8 correspond to the upper limit control unit 104 and lower limit control unit 106. In step SA3, it is determined whether the gradient value S1 is less than 0. In other words, it is determined whether the gradient is descending. In case of the descending gradient, no delays in the estimated input torque $T_{INE}$ for preventing the slippage of the driving belt 12c has to be compensated for. Meanwhile, when it is determined that S1 is equal to or greater than 0, the process proceeds to step SA4. In step SA4, it is determined whether the gradient value S2 is less than the predetermined minimum value A. When the change (change rate represented as the gradient value S2 ) in the estimated input torque is smaller than the minimum value A, the compensation of delays in the estimated input torque $T_{INE}$ for preventing the slippage of the driving belt 12c is not necessary, even if the change may cause noise. Conversely, when NO is obtained in step SA4, that is, the gradient S2 is equal to or greater than the minimum value A, the process proceeds to step SA5. In step SA5, it is determined whether the gradient value S1 is greater than the predetermined maximum value B. The change (change rate) that is greater than the maximum value B may be eliminated as noise such that a control stability is maintained.

As aforementioned, when YES is obtained in step SA3, the process proceeds to step SA6 in which the gradient value S1 is set to 0. When YES is obtained in step SA4, the process proceeds to step SA7 in which the gradient value S1 is set to 0. When YES is obtained in step SA5, the process proceeds to step SA8 in which the gradient value S1 is set to the maximum value B. When NO is obtained in step SA5, the gradient value S1 is maintained at the value calculated in step SA2, and the process proceeds to step SA9 to SA11 corresponding to the drive mode detecting control unit 108. On the basis of a determination result of the drive mode detecting control unit 108, the process proceeds to step SA12 to SA17 corresponding to the compensation gain determining control unit 110.

In step SA9, it is determined whether the presently selected drive mode is the motor drive mode. If NO is obtained in step SA9, the process proceeds to step SA10 in which it is determined whether the presently selected drive mode is the direct drive mode. If NO is obtained in step SA10, the process proceeds to step SA11 in which it is determined whether the presently selected drive mode is the ETC mode. If YES is obtained in step SA9, that is, it is determined that the motor drive mode is selected, the process proceeds to step SA12. In step SA12, the compensation gain $G_1$, which corresponds to a time constant of the start-up operation of the FMG 16 is set. If YES is obtained in step SA10, that is, it is determined that the direct drive mode is selected, the process proceeds to step SA13. In step SA13, the compensation gain $G_2$, which corresponds to a time constant of the start-up operation of the engine 14 is set. If YES is obtained in step SA11, that is, it is determined that the ETC mode is selected, the process proceeds to step SA14. In step SA14, it is determined whether the motor torque Tm, which is generated by the FMG16 (FMG output torque: CVT input shaft torque), is greater than a sum of a creep torque Tc and a predetermined value α. If NO is obtained in step SA14, the compensation gain is set to 0 (the compensation gain is not set) in step SA15 so as to prevent generation of rattling noise owing to the estimated input torque $T_{INE}$ at gear plays. Meanwhile, if YES is obtained in step SA14, that is, the torque Tm is greater than the sum of Tc and α, the process proceeds to step SA16. In step SA16, the compensation gain $G_3$ corresponding to a time constant of the start-up operation of the driving motor operating in the ETC drive mode is set. If NO is obtained in step SA11, that is, it is determined that the ETC mode is not selected, the process proceeds to step SA17. In step SA17, a compensation gain $G_4$ for the motor drive mode (reverse travelling) or the friction drive mode is set.

In step SA18 corresponding to the estimated input torque delay compensating control unit 112, the delay in the estimated input torque $T_{INE}$, calculated in step SA2 is compensated for on the basis of the gradient value S1 calculated in step SA2 and the compensation gain G set in steps SA12 to SA17 according to the previously stored expression (1). In such a manner, the compensated estimated input torque $T_{INE}$ is calculated. The holding pressure control circuit, not shown in FIG. 8, then controls the transmissible tensile force of the driving belt $12_c$ based on the compensated estimated input torque $T_{INE}$, thus maintaining an appropriate torque transmitting capacity.

As described above, in the control system according to the embodiment, the estimated input torque delay compensating control unit 112 (step SA18) compensates for the delay in the estimated input torque $T_{INE}$. The estimated input torque $T_{INE}$ is successively calculated in the estimated input torque calculating control unit 100 on the basis of the gradient value (variation) S1 calculated in the estimated input torque variation calculating control unit 102 (step SA2). Since the friction force to be applied to the driving belt 12c (power transmitting member) of the transmission 12 is controlled to the value corresponding to the compensated estimated input torque $T_{INE}$, an appropriate torque transmitting capacity is obtained even at the time of rapid acceleration of the vehicle, thus realizing good fuel efficiency.

In the estimated input torque variation calculating control unit 102, the gradient value S1 (variation) of the estimated input torque $T_{INE}$, which is equal to or greater than the predetermined value, is calculated (step SA2). If the calculated gradient value S1 is less than the predetermined value, the gradient value S1 is not calculated. Therefore, the delay in the estimated torque $T_{INE}$ is not compensated for. In this way, generation of noise due to a subtle change in the estimated input torque $T_{INE}$ is prevented.

In the estimated input torque delay compensating control unit 112 (step SA18), the delay in the estimated input torque $T_{INE}$ is compensated for by adding a product of the compensation gain G, corresponding to the start-up operation characteristics of the respective driving motors, such as the engine 14 and FMG 16, and the gradient value (variation) S1 of the estimated input torque $T_{INE}$ calculated by the estimated input torque variation calculating unit 102 (step SA2), to the estimated input torque $T_{INE}$ calculated by the estimated input torque calculating control unit 100. Accordingly, appropriate hydraulic responses are made irrespective of the different power plants to be changed according to the drive mode, and thereby the compensation of delays in the estimated input torque $T_{INE}$ is ensured. In this way, an appropriate torque transmitting capacity is obtained even at the time of rapid acceleration of the vehicle, realizing good fuel efficiency.

The control system of the embodiment is applied to a hybrid vehicle and includes the drive mode detecting control unit 108 (steps SA9, SA10, and SA11) for detecting the drive mode of the hybrid vehicle and the compensation gain determining unit 120 (steps SA12, SA13, SA14, SA15, SA16, and SA17) for determining the compensation gains according to the drive mode detected by the drive mode detecting control unit 108. With this arrangement, the compensation gain G is determined for each type of driving motor used in the drive mode, thereby providing further precision in compensating for the delays in the estimated input torque $T_{INE}$.

The transmission 12 in the control system according to the embodiment is a belt drive CVT that transmits power via the friction between the pair of variable pulleys 12a, 12b having variable effective diameters and the driving belt 12c wrapped around the variable pulleys 12a, 12b. The transmission 12 includes the driving belt 12c holding pressure control unit 114 which controls the torque transmitting capacity by determining the holding pressure for holding the driving belt 12c based on the estimated input torque $T_{INE}$, in which the delay is compensated for by the estimated input torque delay compensating control unit 112. Accordingly, an appropriate torque transmitting capacity is obtained even at the time of rapid acceleration of the vehicle, while still realizing good fuel efficiency.

Further, according to the embodiment, the gradient value S1 calculated by the estimated input torque variation calculating control unit 102 (step SA2) is an average value of the gradients ($T_{INEi}-T_{INEi-2}$) and ($T_{INEi-1}-T_{INEi-3}$) in two adjacent time ranges of a transition of the estimated input torque $T_{INE}$ and therefore the noise due to a small torque change is effectively prevented.

While the first embodiment has been described with reference to the drawings, it is to be understood that the invention is not limited to the above-described embodiments or constructions but is intended to cover various modifications and equivalent arrangements which may be produced by persons skilled in the art.

For example, while the gradient value S1 in the first embodiment, which represents variations in the input torque, is an average value of the gradients ($T_{INEi}-T_{INEi-2}$) and ($T_{INEi-1}-T_{INEi-3}$) in two adjacent time ranges of a transition of the estimated input torque $T_{INE}$, in another embodiment, the gradient value S1, may be an average value of gradients in three time ranges or may be a value obtained in one time range.

Further, while the first embodiment includes the upper limit control unit 104 and lower limit control unit 106, those control units are not necessarily required.

Also, while, in the first embodiment, the expression (1) is used for the compensation of the estimated input torque $T_{INE}$ by the estimated input torque compensating control unit 112, in another embodiment, other expression may be used.

Additionally, while the first embodiment is employed for compensating for the delay in the estimated input torque to the transmission 12 of the hybrid vehicle which selectively uses one engine (engine 14) and one front motor generator (FMG16) as the power plant, another embodiment may be applied to vehicles which uses one engine, front motor generator, or motor as the power plant.

Further still, while the transmission 12 of the first embodiment is a belt drive CVT which includes a pair of variable pulleys 12a and 12b having variable effective diameters and the drive belt 12c wrapped around those pulleys and transmits power via the drive belt 12c, in another embodiment, the transmission 12 may be a traction drive CVT having a pair of cones and a roller that is held therebetween and is rotatably supported around a rotation axis that lies in a plane perpendicular to the rotation axes. That is, the transmission 12 may be any type of CVT in which the power is transmitted via the friction between power transmitting members or shear strength of oil film formed thereon. In other words, any type of CVT including input and output rotating parts and a power transmitting member interposed therebetween, in which the speed transmission ratio changes as radial positions of those rotating members from the center of the rotation of the power transmitting member change may be used.

In the illustrated embodiment, the controller (one or more ECUs) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A control system that controls a continuously variable transmission of a vehicle, in which the continuously variable transmission changes a speed ratio of an input rotating member and an output rotating member by continuously changing a radial position at which torque is transmitted between a power transmitting member interposed between the input rotating member and the output rotating member, and each of the input and the output rotating members, the radial position being measured from a center of rotation of each of the input and the output rotating members, the control system comprising a controller that controls a capacity of torque transmission between each of the input and output rotating members and the transmitting member based upon an input torque of the continuously variable transmission, wherein the controller:

calculates an estimated input torque of the continuously variable transmission;

calculates an amount of variation in the calculated estimated input torque of the continuously variable transmission; and compensates for a delay in the estimated input torque on the basis of the calculated variation of the estimated input torque of the continuously variable transmission prior to controlling the capacity of the torque transmission.

2. The control system according to claim 1, wherein the controller calculates the amount of the variation in the estimated input torque by determining an average of gradient values obtained at a plurality of time points in a current cycle and at least one preceding cycle.

3. The control system according to claim 1, wherein the controller calculates whether the amount of the variation in the estimated input torque is equal to or greater than a predetermined value.

4. The control system according to claim 1, wherein the controller compensates for the delay in the calculated estimated input torque by adding a product of a compensation gain obtained in accordance with a start-up characteristic of a torque of a driving motor of the vehicle and the calculated variation in the calculated estimated input torque to the calculated estimated input torque.

5. The control system according to claim 4, wherein the driving motor comprises at least one of an engine, a motor/generator, and an electric motor.

6. The control system according to claim 4, wherein the vehicle is a hybrid vehicle, and wherein the controller further:

determines a currently selected drive mode of the vehicle; and determines the compensation gain in accordance with the determined currently selected drive mode of the vehicle.

7. The control system according to claim 1, wherein the continuously variable transmission transmits power via a frictional force generated between a pair of variable pulleys each having a variable effective diameter and a driving belt wrapped around the pair of variable pulleys, and wherein the controller controls the capacity of the torque transmission by determining a holding pressure of the driving belt on the basis of the estimated input torque with the delay compensated.

8. A method for controlling a continuously variable transmission of a vehicle, which changes a speed ratio of an input rotating member and an output rotating member by continuously changing a radial position at which torque is transmitted between a power transmitting member interposed between the input rotating member and the output rotating member, and each of the input and the output rotating members, the radial position being measured from a center of rotation of each of the input and the output rotating members, the method comprising:

calculating an estimated input torque of the continuously variable transmission;

calculating an amount of variation in the calculated estimated input torque of the continuously variable transmission;

compensating for a delay in the estimated input torque on the basis of the calculated variation of the estimated input torque of the continuously variable transmission; and controlling a capacity of torque transmission between each of the input and output rotating members and the transmitting member based upon the delay compensated estimated input torque of the continuously variable transmission.

9. The method according to claim 8, wherein the variation in the estimated input torque is calculated by determining an average of gradient values obtained at a plurality of time points in a current cycle and at least one preceding cycle.

10. The method according to claim 8, further comprising determining whether the calculated amount of variation of the estimated input torque is equal to or greater than a predetermined value.

11. The method according to claim 8, wherein the delay in the calculated estimated input torque is compensated for by adding a product of a compensation gain obtained in accordance with a start-up characteristic of a torque of a driving motor of the vehicle and the calculated variation in the calculated estimated input torque to the calculated estimated input torque.

12. The method according to claim 11, wherein the driving motor comprises at least one of an engine, a motor/generator, and an electric motor.

13. The method according to claim 11, wherein the vehicle comprises a hybrid vehicle, and further comprising:

determining a currently selected drive mode of the vehicle; and determining the compensation gain in accordance with the determined currently selected drive mode of the vehicle.

14. The method according to claim 8, wherein the continuously variable transmission transmits power via a frictional force generated between a pair of variable pulleys each having a variable effective diameter and a driving belt wrapped around the pair of variable pulleys, and wherein the capacity of the torque transmission is controlled by determining a holding pressure of the driving belt on the basis of the estimated input torque with the delay compensated.

* * * * *